United States Patent [19]

Schulze

[11] Patent Number: 4,978,161

[45] Date of Patent: Dec. 18, 1990

[54] APPARATUS AND METHOD FOR APPLYING A TARGA-LIKE BAND TO A CONVERTIBLE TOP VEHICLE

[76] Inventor: Todd M. Schulze, P.O. Box 540924, Orlando, Fla. 32854-0924

[21] Appl. No.: 334,698

[22] Filed: Apr. 6, 1989

[51] Int. Cl.⁵ ............................................. B60R 27/00
[52] U.S. Cl. ................................ 296/180.1; 296/102; 29/401.1
[58] Field of Search ............. 296/1.1, 102, 103, 180.1, 296/210; 29/401.1; 280/756

[56] References Cited

U.S. PATENT DOCUMENTS

| 3,065,021 | 11/1962 | Geiger | 296/102 |
| 4,557,502 | 12/1985 | Scaduto et al. | 280/756 |
| 4,711,485 | 12/1987 | Maebayashi et al. | 280/756 X |

FOREIGN PATENT DOCUMENTS 15120 1/1987 Japan ................................... 296/107

OTHER PUBLICATIONS

Angelucci, E. et al., The Automobile from Steam to Gasoline, New York; McGraw-Hill, 1976, p. 203.
Harding, A., ed., Cars in Profile Collection I, New York; Doubleday & Co., 1974, pp. 7-17 & 22.
Batchelor, D., Illustrated Porsche Buyer's Guide, Wis., Motorboks International, 1982, pp. 70-113.
Boschen, L., The Porsche Book, New York; Arco Publishing, Inc., 1984, pp. 158, 159, 168.
Baldwin, N. et al., *Corvette:* United Kingdom: Multimedia Publications, 1984, pp. 52, 53, 63.
Eaton, G., The Classic Ferrari, Conn., Bison Books Corp., 1983, pp. 14, 16, 19, 25, 27.
Barries, G. et al., Famous Custom & Show Cars., New York: E. P. Dalton & Co., Inc., 1973, pp. 68-71, 94, 117.
Automobile Quarterly Series, The Complete Corvette Restoration & Technical Guide-vol. 1, 1953-1962, N.J.: Princeton Publishing Inc., 1980, pp. 162, 163, 267-270, 369, 418-419.
Harding, A., ed., Cars in Profile Collection 2, N.Y.; Doubleday & Co., 1974, pp. 176-178, 180-181, 184, 221-224, 226-229.
Performance Aftermarket Magazine; vol. 1, No. 1, Nov. 1988, pp. 79,125.
Eckler's Corvette Parts & Accessories Catalog, Titusville, Fla., Fall/Winter 1988-1989, p. 99.

Primary Examiner—Margaret A. Focarino
Assistant Examiner—Gary C. Hoge
Attorney, Agent, or Firm—Warren L. Franz

[57] ABSTRACT

An inverted U-shaped band member, having opposite upwardly and inwardly directed pillar portions joined by a central bar portion, has protruding elements that fit through peripheral openings on opposite sides of the rear of a vehicle passenger compartment, to releasably lock the band member in place of a conventional convertible top to give a readily-removable Targa-like, integral roll bar apparatus option. A preferred band member is sectioned with left and right halves aligned by rods in one half that fit into open end tubes in the other. Alignment is assured by inserting the tubing in a unitary structure prior to sectioning the member. A clamp and hook arrangement locks the joined sections together. The sides of the band have hollows for attaching a hubcap-type manufacturer's emblem on the band member.

18 Claims, 2 Drawing Sheets

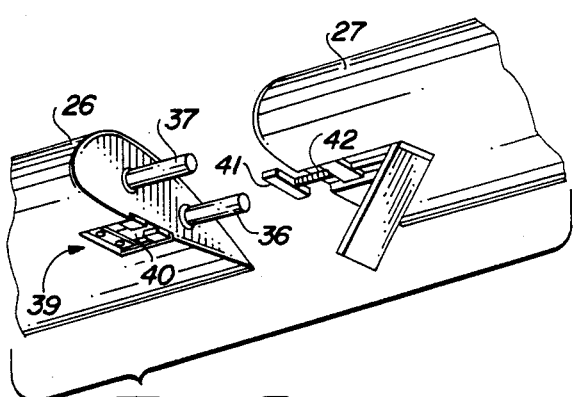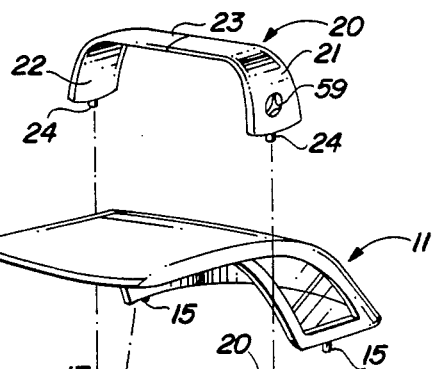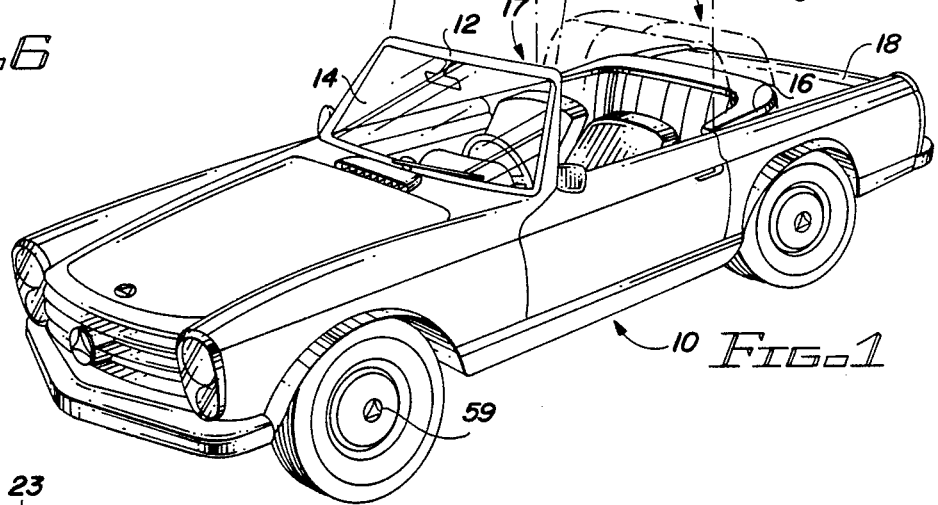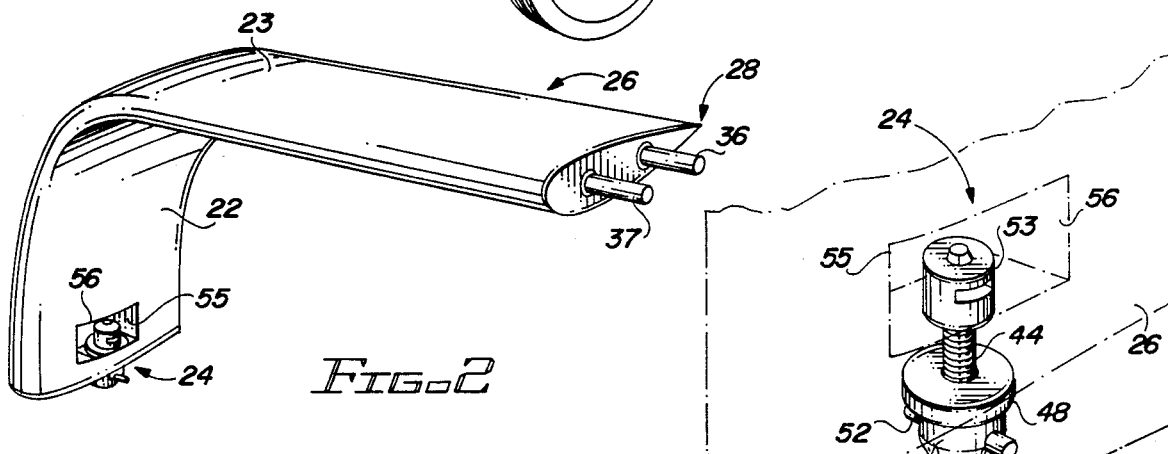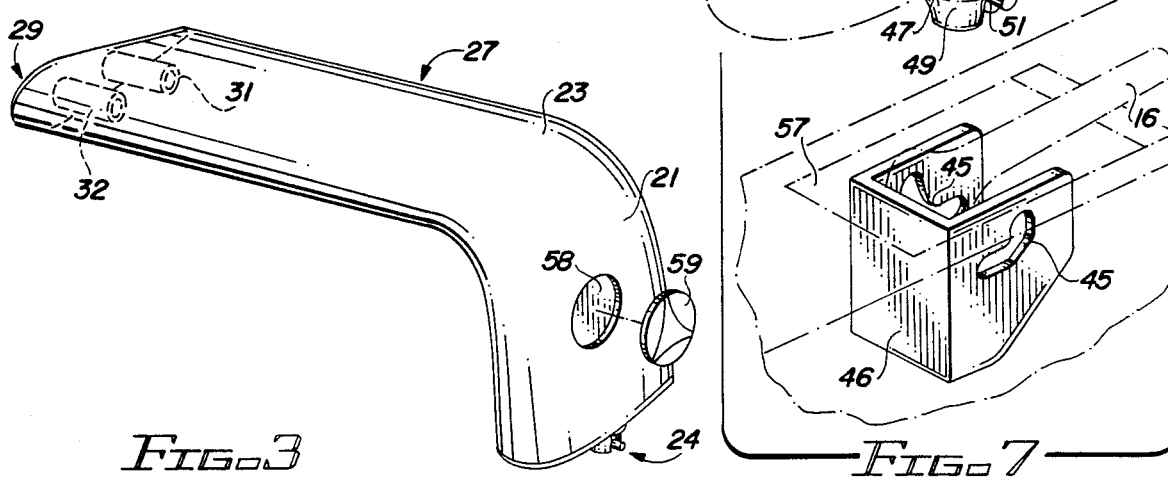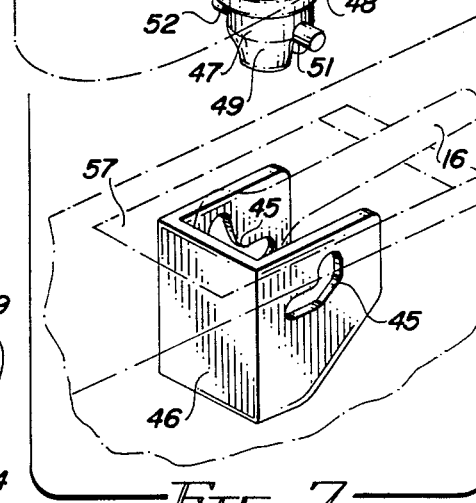

APPARATUS AND METHOD FOR APPLYING A TARGA-LIKE BAND TO A CONVERTIBLE TOP VEHICLE

This invention relates to an apparatus and method for applying a laterally extending, Targa-like band over the rear of the passenger compartment of a convertible top vehicle.

BACKGROUND OF THE INVENTION

Air flow directors of various types are well-known for vehicles such as automobiles and trucks. Such devices include front and rear body-mounted airfoils like inverted wings, rear- and roof-mounted spoilers or air dams, and bottom-mounted skirts. Such aerodynamics shapers and ground effects equipment have become popular on racing vehicles for increasing road contact at high speeds and for imparting greater stability. Their appeal has spread to sports car enthusiasts in the general public, so that airfoils, spoilers and skirts are now utilized for aesthetic and cosmetic purposes on many road vehicles, even in the absence of any aerodynamic requirement.

In the early 1960's, Ferrari's entry to the championship sports car racing courses included the sleek looking rear-engined 250P which had an integral, inverted U-shaped roll bar (sometimes called "anti-roll bar") or band extending laterally across the rear of the cockpit, just behind the driver's seat, and which also acted as an air slot to steady airflow over the rear deck. In 1963, the improved handling and road holding capabilities of the 250P made it "unrivalled among its contemporaries." It won three of the four major events counting towards the Manufacturer's World Championship in its class: the Sebring, the Nürburgring and the LeMans. (It only lost the Targa Florio to Porsche because it was driven off the road.) See, A. Harding, *Cars in Profile: Collection 1*, Doubleday & Co. ed. 1974, page 7.

An integral roll bar has become fashionable even for off-track sports cars. The 911 Targa body style, which was introduced by Porsche in 1965 and has remained popular since, features an all-steel form body structure welded into a single-unit body chassis that has an inverted U-shaped roll bar connecting its two sides across the rear of the passenger compartment at the location of the back of the front seats. The 911 style also featured a removable roof. The first cars had zip-out back windows like those of normal convertibles, but problems caused Porsche to go to a less sporty, fixed, glass rear window. See, D. Batchelor, *Illustrated Porsche Buyer's Guide*, Motorbrooks Int'l 1982, pages 70-77. Such integral roll bar construction has also been introduced into other manufacturer's automobiles as, for example, the Fiat X1/9 (designed by the same people who designed the Ferrari) and removable roof panel versions of the Corvette (with or without a "T-bar" centerline strut). Integral roll bars of the type under discussion are commonly referred to in the automobile trade as "Targa" bars or bands, regardless of which brand automobile is being referenced.

Targa bands, by virtue of their very roll bar nature and origin, are integral welded components of the associated vehicle body structure.

Conventional automobile Targa bands are bow-like structures of continuous truncated arcuate contour that stretch laterally from side-to-side over the rear of the passenger compartment. They have opposite pillar portions which reach upwardly and inwardly from lower ends that join the left and right sides of the rest of the body at positions generally located between the rear edges of the front doors and the front area (rear window connecting area) of the rear deck, to inwardly rounded upper ends which are connected together by a generally horizontally disposed, elongated central portion. In a usual configuration the band is relatively thin, with a width (front-to-back dimension) that is mostly uniform across the central portion but decreases slightly from lower to upper ends in the pillar portions. The width of the central portion is relatively greater than its thickness. The band is usually, though not necessarily, oriented to give it a slight backwardly tilted appearance when viewed from the side, with front and rear edges of the band at the upper ends of the pillar portions being respectively located to the rear of the same edges at the lower ends of the pillar portions. The height (vertical dimension) of the band is normally such as to coincide with the height of the front windshield, to place the top surface of the band generally in line with the header of the windshield, and the band is smoothly contoured and lined to match the contour and lining of the rest of the vehicle body.

The back of the Targa band customarily serves as part of the framework for a straight or sweptback window. The front of Targa-type bands of automobiles, such as Corvettes, is sometimes equipped in its central portion with a front edge lip recess or otherwise configured to accommodate the trailing edges of one or more removable roof panels. The windshield header is configured to receive the leading edges of such panels, and a longitudinal centerline strut extending between the header and the front of the Targa band (providing a "T" configuration) may provide additional roof top panel support. The front edges of the pillar portions of the band may be configured to provide guideways for the trailing edges of the front door side windows.

Conventional automobiles with removable tops are currently either of the Targa band, removable roof panel type or of the conventional convertible top type with folding flexible material top and/or removable hardtop options. They are not both.

Vehicles with folding convertible tops have flexible decking material stretched over a retractable frame comprising front, central and rear bows. The bow framework may be completely removable but, more commonly, folds back after release from the front windshield header into a storage position in the well behind the seats of the passenger compartment at the front of the trunk space or, as is done in recent model Corvettes, folds down into a storage cavity at the rear of the passenger compartment which is covered by a rear deck lid.

The term "hardtop" is the name given to a roof construction in which the usual central or B-pillar roof-supporting posts (which on four-door sedans are situated between the front and rear doors) are missing so that the roof is supported only by the A-pillars which frame the sides of the front windshield and by the C-pillars which frame the sides of the rear windshield Mercedes 280SL, 350SL and similar sports cars have a removable hardtop option that provides the advantages of a convertible top with the greater durability of a hard canopy.

With both convertible folding or "rag" tops and convertible removable hardtops (both collectively hereinafter referred to as "convertible tops"), means including slots or openings peripherally of the passenger compartment are provided to releasably lock protruding pins or similar elements of the removable top in its passenger compartment covering position. Typically the vehicle body of a convertible top automobile will have a recess located at each upper corner of the front windshield, a recess located at the corner of each side of the rear of the passenger compartment, and a recess located centrally at the rear of the passenger compartment at the front of the rear deck. The convertible top pins are fit into the recesses and releasably locked therein by quarter-turn T-bolt or other locking mechanisms to retain the same in place.

Convertible top automobiles operated with the top folded or removed have a rectangular box-like, generally horizontal upper profile when viewed from the side, interrupted only by the swept back vertical projection of the front windwhield at the front of the passenger compartment. The aesthetically pleasing effect of the integral Targa band roll bar structure, available only with removable top panels and not convertible tops, is absent. Moreover, the passenger compartment of the folded or removed convertible top automobile is completely open except for the windshield, thereby permitting uncontrolled entry of turbulent air flows that can cause passenger discomfort or at least disheveled appearance.

SUMMARY OF THE INVENTION

It is an object of the present invention to provide an apparatus and method for imparting a Targa-like, integral roll bar band appearance to a conventional "rag" top or hardtop convertible vehicle.

It is a further object of the invention to provide an apparatus and method for retrofitting a conventional convertible top vehicle with a readily removable air flow director at the rear of the passenger compartment for improving passenger comfort when the vehicle is operated with the top open.

It is yet another object of the present invention to provide a readily removable, rigidly connectable Targa-like band structure across the rear of a vehicle passenger compartment by utilizing means of attachment which mate with conventional elements utilized in maintaining a conventional convertible top in its compartment covering position.

The foregoing and other objectives and advantages of the invention are achieved by providing an inverted U-shaped band structure having opposite, upwardly and inwardly directed pillar portions joined at their ends by an interconnecting laterally extending central bar portion, and with their lower ends being accommodated with elements for securing the structure at peripherally located points of the rear of a vehicle passenger compartment by establishing a releasable, rigid connection of the same to conventional elements forming a part of a conventional convertible top securing and locking system.

In a preferred embodiment of the invention, described in greater detail below, a Targa-like band structure is provided with an airfoil cross-sectional configuration and opposite pillar portions each provided with a depending pin that fits within a conventional convertible top receiving slot located at a respective rear corner of an existing vehicle body and locks therein in a manner similar to that conventionally employed for engaging and locking a convertible top. The described band structure is preferably formed in left and right sectional halves of foam-filled fiberglass, centrally aligned by means of axially parallel rods protruding from one section that fit within the facing open ends of tubular channels in the other section, and are held together by a manually manipulable clamp assembly. The pillar portions are advantageously formed on their exterior sides with hollows shaped to receive an emblem, such as the usual hubcap emblem, of the manufacturer of the automobile on which the band will be deployed. The front edges of the band may be optionally recessed or grooved to provide channels for receiving and steadying the rear edges of raised door windows or for receiving the rear edges of roof panels. The airfoil cross-section may be advantageously shaped to reduce air turbulance within the passenger compartment for increasing the comfort of occupants.

BRIEF DESCRIPTION OF THE DRAWINGS

Embodiments of the invention have been chosen for purposes of illustration, and are shown in the accompanying drawings, wherein:

FIG. 1 is a perspective view of a band member in accordance with the invention, shown for substitution in place of a conventional hardtop on a known sports coupe automobile body;

FIG. 2 is a perspective view of a right half section of the band member of FIG. 1;

FIG. 3 is a perspective view of a left half section of the band member of FIG. 1;

FIG. 6 is a fragmentary view of the undersides of mating portions of the sections of FIGS. 2 and 3, showing clamping elements therefor;

FIG. 7 is an enlarged view, with environmental structure shown in phantom, of interlocking elements of the band member and automobile of FIG. 1.

Throughout the drawings like elements are referred to by like numerals.

DESCRIPTION OF THE PREFERRED EMBODIMENTS

Figure 4:
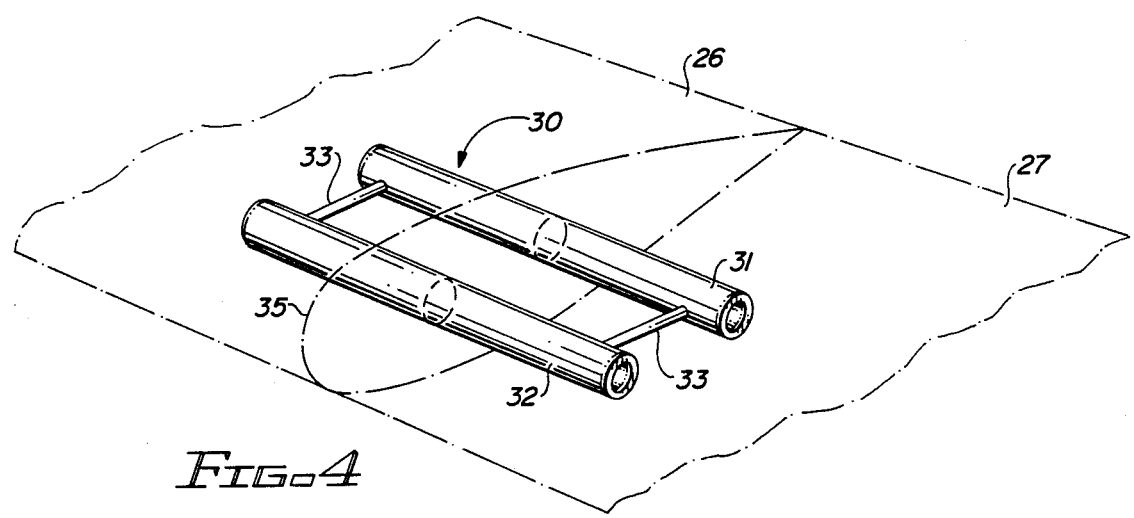
FIGS. 4 and 5 are views helpful in understanding the construction of means for aligning the sections of FIGS. 2 and 3.

The principles of the invention are illustrated, by way of example, in their application for use with a known two-door sports coupe automobile 10, shown in FIG. 1, which has both removable hardtop 11 and folding top (not visible in shown folded position) convertible top options. The hardtop 11 is attachable to the header 12 of windshield 14 and by means including protruding elements 15 to the main body of the vehicle 10 within holes or slots 16 located peripherally on opposite sides of the rear of the passenger compartment 17 at the front of the rear deck 18.

In accordance with the invention, upon removal of the convertible top 11 an inverted U-shaped band member 20, having left and right pillar portions 21, 22 depending from a laterally extending central bar portion 23, is insertable by means of protruding elements 24 similar to elements 15 for establishing a readily-releasable locking connection into the same slots 16. In the attached position (shown by dot and dashed lines in FIG. 1), the band member 20 extends across the rear of the passenger compartment of the vehicle 10, with the member 20 being dimensioned, configured and positioned to impart a Targa-like band, integral roll bar appearance to the vehicle 10.

For the shown embodiment, when the member 20 is in its mounted position on vehicle 10, the lower ends of the pillar portions 21, 22 join the upper surfaces of the body of the vehicle 10 at positions just behind the rear upper corners of the doors. The band 20 is shaped to give the same thin, tapered pillar portion, slightly backwards tilt, smooth and continuous contour of the prior art integral Targa bands described above.

As shown in FIGS. 2-3, the member 20 preferably has two half sections 26 and 27 having airfoil cross-sectional configurations and including complementary alignment means 28, 29 located to join facing inner end portions thereof. Providing the band member 20 to the end user in sectional, rather than single unit, format facilitates trunk or garage storage of the band 20 when not in use. The band 20 is conveniently formed first as a unitary structure and then sectioned afterwards. The band member 20 may be formed of known vehicle airfoil/air deflector materials, such as by molding the same in two fiberglass pieces which are bonded together after curing and prepared with external surfaces to have coloring, contouring and texture to match the coloring, contouring and texture of the rest of the associated vehicle 10.

Figure 5:
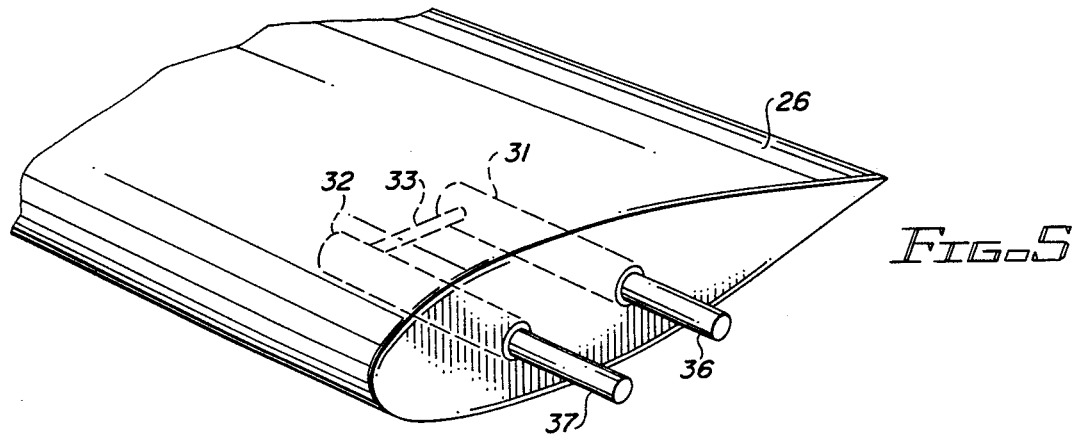

In a preferred manufacturing technique (see FIGS. 4 and 5) a rigid assembly 30 comprising equal lengths of acrylic hollow tubing 31, 32 held in spaced parallel fixed positions by means of cross pins 33 joining facing surfaces of the tubes 31, 32 adjacent their extremities is placed in axial alignment within the central region of one molded piece of the two molded piece, initially unitary structure of the band 20. The second molded piece is then bonded in place over the tubing assembly 30, with the core of the band 20 (at least in the neighborhood of the received assembly 30) filled with urethane foam or other suitable material to support the assembly 30. The tubes 31, 32 are then sectioned along with the band 20 by sawing or otherwise cutting along a bisecting plane 35 (indicated by dot and dash lines in FIG. 4) to provide aligned ends of tubes 31, 32 in opposing relationship in the facing joinder portions of the sections 26, 27 in the center of the sectioned band member 20. Dowels 36, 37 (see FIGS. 2 and 5), having an outside diameter to fit within the inside diameter of the tube ends 31, 32, are secured within the tube ends 31, 32 of one of the sections 26, 27 as shown. The dowels 36, 37, suitably aluminum rods, are chosen of lengths to be securely received within the tube ends 31, 32 and project outwardly therefrom for a suitable distance so that the same may be removably inserted within the opposing tube ends 31, 32 of the other section 26, 27.

With reference to FIGS. 2 and 3, it will be readily appreciated that aligned halves of the central bar portion 23 of the band member 20 can be rapidly aligned by insertion of the projecting rods 36, 37 of the right half section 26 into the facing open ends of the tubes 31, 32 of the joined left half section 27. The same may be releasably retained in rigid aligned connection by means of a commercially available clamp, such as a Dzus TL300 adjustable grip toggle latch or similar adjustable clamping assembly 39 having mating parts 40, 41 located on the respective sections 26, 27 of the member 10. For the embodiment illustrated in FIG. 6, a hinged handle and draw bar element 41 is brought over a complementary double hook strike element 40 when the sections 26, 27 are mated together in tight relationship. Elements 40, 41 are shown recessed within hollows on the undersides of the sections 26, 27 adjacent their joining ends, with the draw bar portion of element 41 being made adjustable by means of a threaded shaft 42 for selectively varying the actual position of the element 41 relative to the position of the element 40 in the joined device to give the desired locking tension.

Each section 26, 27 of the member 20 is provided with a protruding element 24 similar to the corresponding element 15 of the conventional convertible top 11. The depicted mechanism 24 is of a type suitable for providing a releasable locking connection with the conventional automobile body portion of the attachment mechanism for a hardtop 11 of a Mercedes-type two-door sports coupe 10. It will, of course, be appreciated that suitable mechanisms 24 can also be constructed to releasably cooperate with corresponding body-mounted locking elements and slots of Jaguar, Porsche, MG, Austin-Healey, Triumph, Alfa Romeo, Corvette, Thunderbird and other convertible topped automobiles.

The illustrated mechanism 24, shown in detail in FIG. 7, comprises a threaded T-bolt 44 appropriately journalled within a sleeve or similar bushing (not shown) within a connecting lower end of each pillar portion 21, 22 to protrude downwardly therefrom for interconnecting with arcuate slots 45 of a conventional convertible top locking bracket 46 located below the slot 16 peripherally of the rear of the passenger compartment of the vehicle 10 (see FIG. 1). The protruding portion of the T-bolt 44 is shrouded by a polymeric spacing element 47 which has a broadened top ring section 48 and an inwardly tapered rounded bottom section 49 having downwardly opening longitudinal slots 51 into which the perpendicular projections 52 of the T-bolt 44 can be upwardly inserted. A tool manipulable key-slotted element 53 is secured to the upper end of the T-bolt 44 and located within a cavity 55 in each pillar portion 21, 22 that is accessible from the passenger compartment side through a window 56.

After joining the sections 26, 27 together by inserting the rods 36, 37 of section 26 within the open tubes 31, 32 of section 27 and clamping the same by mating the elements 40, 41 the lower ends of the pillars 21, 22 of the band member 20 are brought down on opposite sides at the rear of the passenger compartment 17 of the vehicle 10, bringing each spacer 47 into an expanded end of the keyhole shaped slot 16 framed by the chrome member 57. The perpendicularly projecting ends 52 of the T-bolt 44 are brought into alignment with the widened upper ends of arcuate slots 45 of the bracket 46. Applying a one-quarter turn to the keyslot of the element 53 by means of a convertible top locking tool (not shown) inserted through the window 56 into the cavity 55 (FIG. 2), the ends 52 of the T-bolt 44 are caused to travel along the slots 45, bringing the bottoms of the pillar portions 21, 22 into rigid, locking engagement with the body of the vehicle 10. The rigid connection cooperates with suitable dimensioning and proportioning of the member 20 to give the appearance that the band member 20 is an integral roll bar component of the vehicle 10. The members 20 can be customized and matched for different vehicle styles to give the desired sleek and sporty appearance effect to each.

Figure 8A:
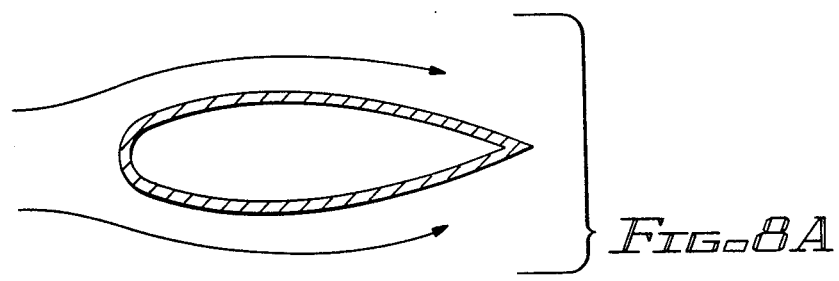
FIGS. 8A–8C are views showing airfoil cross-sections for the band member.
Figure 8B:
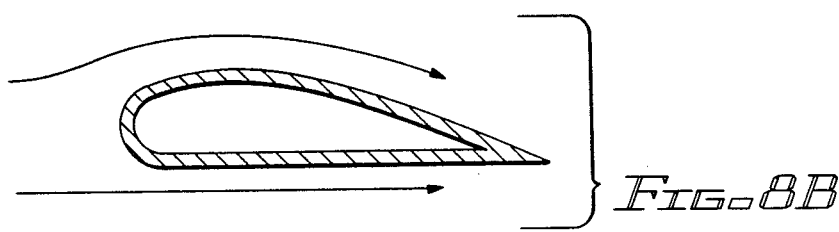
Figure 8C:
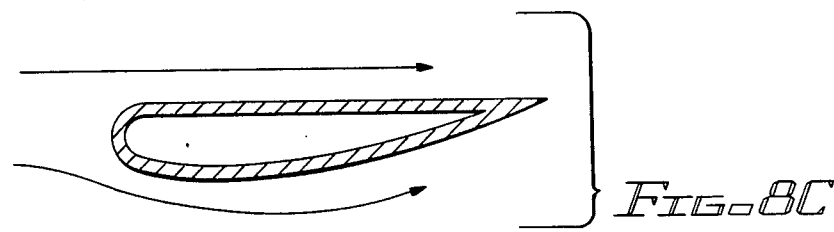

As shown in FIG. 3, the outwardly facing side surface of each pillar portion 21, 22 may be optionally provided with a circular hollow 58 into which a matching circular hubcap automobile manufacturer's emblem 59 (see also FIG. 1) may be inserted. The cross-section of the band 20 may take any desired form, such as one of the air foil shapes shown in FIGS. 8A-8C. The band 20 is intended for use without a rear window installed but, of course, provision can be made for installation of the same if desired. Provision can also be made to groove the leading edges of member 20 at the pillar 20, 21 and/or central bar 23 portions to provide channels for receiving rear side edges of raised door windows and/or deck-type roof panels or provisional raincoat type roof coverings therein. Proper shaping of the cross-section of member 10 can advantageously improve the flow of air over the automobile 10 beyond the front windshield 14 to reduce air turbulence to increase occupant comfort within the passenger compartment of the automobile 10.

As apparent from the foregoing description, the invention provides an apparatus and method for converting a conventional convertible hardtop and/or folding top vehicle into a vehicle having a Targa-like band, integrated roll bar appearance. The readily attachable/removable band 20, described above, while preferably half-sectioned for convenience of storage may redily be accommodated in a single-piece design, if desired, having means similar to those described above for effecting a rigid, releasable connection with conventional body-mounted elements normally serving to secure a convertible top. The band can also be configured in more than two sections and with a centerline strut joining the windshield header.

It will be appreciated by those skilled in the art to which the invention relates that the foregoing detailed description is intended to be merely exemplary and not exclusive, and that various other substitutions and modifications may also be made to the described embodiments without departing from the spirit and scope of the invention as defined by the claims below.

What is claimed is:

1. A readily removable attachment for applying to a vehicle in place of a conventional convertible top, said vehicle comprising:
   a body including a passenger compartment having a rear, openings located on upper surfaces of said body peripherally on opposite sides of said rear, and elements located on said body and accessible through said openings for releasably lockingly engaging complementary protruding elements of said convertible top thereto; and
   said attachment comprising:
   an inverted U-shaped band member having opposite upwardly directed pillar portions with upper and lower ends, and a laterally extending central bar portion interconnecting said upper ends; and
   means, including elements protruding from said lower ends, for releasably lockingly engaging in complementary fashion with said body located elements;
   said band member having an airfoil cross-sectional configuration; and
   said attachment being dimensioned, configured and adapted so that when said attachment is brought into position over said rear of said passenger compartment in place of said top, said elements protruding from said lower ends can be brought through said openings and locked to said body located elements to establish a releasable rigid connection between said band member and said body to impart a Targa-like, integral roll bar appearance to said vehicle.

2. Apparatus as in claim 1, wherein said vehicle is a two-door vehicle and said openings are located just behind rear edges of said vehicle doors, and wherein said band member has a leading edge which extends generally in line with said rear edges of said doors when said member is brought into position with said lower end protruding elements locked to said body located elements 3. Apparatus as in claim 1, wherein said pillar portions of said band member reach upwardly and inwardly from said lower ends to said upward ends, and wherein said upward ends are inwardly rounded to provide a smooth and continuous contour from said lower ends to said upper ends and to said central bar portion.

4. Apparatus as in claim 3, wherein said central bar portion is generally horizontally disposed and has a width which is relatively greater than its thickness and which width is mostly uniform across the extent of said central bar portion.

5. Apparatus as in claim 4, wherein said pillar portions have widths which decrease from their lower to their upper ends to give a slight tapered appearance.

6. Apparatus as in claim 6, wherein the band member is configured with a backward tilt so that, when said member is brought into locked position on said vehicle in place of said convertible top, said band member has front and rear edges at said upper ends which are located respectively to the rear of the body relative to the same edges at said lower ends.

7. Apparatus as in claim 1, wherein said vehicle has a front windshield and a header across the top of said windshield, and wherein said band member is dimensioned, configured and adapted so that when said member is brought into locked position on said vehicle in place of said convertible top, said upper ends will be generally at the same elevation as said header.

8. Apparatus as in claim 1, wherein at least one of said pillar portions has an exterior side shaped with a hollow to receive a conventional vehicle manufacturer's emblem for display therein.

9. Apparatus as in claim 1, wherein said vehicle is an automobile of a two-door sports coupe design type having keyhole shaped openings on opposite sides of said rear of said passenger compartment and brackets with arcuate slots located on said body for receiving perpendicular projections of protruding, quarter-turn locking elements of a hardtop convertible top therein, wherein said pillar portions of said attachment include cavities accessible through interiorly facing windows, and wherein said elements protruding from said lower ends of said attachment comprise T-bolts having perpendicular projections at their bottom ends, and slotted elements at their upper ends which are accessible through said windows to turn said bolts to engage said bottom end perpendicular projections within said arcuate slots.

10. Apparatus as in claim 1, wherein said band member comprises first and second sections, means for aligning said first and second sections into joining engagement, and means for releasably maintaining said sections in said joined engagement.

11. A readily removable attachment for applying to a vehicle in place of a conventional convertible top, said vehicle comprising:
   a body including a passenger compartment having a rear, openings located on upper surfaces of said body peripherally on opposite sides of said rear, and elements located on said body and accessible through said openings for releasably lockingly engaging complementary protruding elements of said convertible top thereto; and said attachment comprising:

an inverted U-shaped band member having opposite upwardly directed pillar portions with upper and lower ends, and a laterally extending central bar portion interconnecting said upper ends; and means, including elements protruding from said lower ends, for releasably lockingly engaging in complementary fashion with said body located elements;

said band member comprising first and second sections, means for engagement, and means for releasably maintaining said sections in said joined engagement;

said aligning means comprising a rod protruding from said first section and a tube in said second section having an exposed hollow end into which said rod can be fitted; and said attachment being dimensioned, configured and adapted so that when said attachment is brought into position over said rear of said passenger compartment in place of said top, said elements protruding from said lower ends can be brought through said openings and locked to said body located elements to establish a releasable rigid connection between said band member and said body to impart a Targa-like, integral roll bar appearance to said vehicle.

12. Apparatus as in claim 11, wherein said releasably maintaining means comprises a hinged handle and draw bar element located on said first section and a double hook strike element located on said second section, and means for selectively adjusting the relative locations of said first and second section elements.

13. A method for converting a vehicle having a conventional convertible top into a vehicle having a Targa-like band, integral roll bar appearance, said vehicle comprising:

a body including a passenger compartment having a rear, openings located on upper surfaces of said body peripherally on opposite sides of said rear, a convertible top having locking elements protruding through said openings, and complementary locking elements located below said openings on said body and releasably mated with said protruding locking elements; and said method comprising the steps of:

unlocking said convertible top protruding locking elements from said body located complementary locking elements and removing said protruding locking elements through said openings; and securing to said body in place of said convertible top an attachment comprising an inverted U-shaped band member having opposite upwardly directed pillar portions with upper and lower ends, and a laterally extending central bar portion interconnecting said upper ends; and elements protruding from said lower ends; said lower end protruding elements being brought through said openings into releasable locking engagement with said body-located complementary locking elements.

14. In combination with a vehicle adapted to receive thereon a conventional convertible top, said vehicle comprising:

a body including a passenger compartment having a rear, openings located on upper surfaces of said body peripherally on opposite sides of said rear, and elements located on said body and accessible through said openings for releasably lockingly engaging complementary protruding elements of said convertible top thereto;

an attachment comprising:

an inverted U-shaped band member having opposite upwardly directed pillar portions with upper and lower ends, and a laterally extending central bar portion interconnecting said upper ends; and means, including elements protruding from said lower ends, for releasably lockingly engaging in complementary fashion with said body located elements;

said band member having an airfoil cross-sectional configuration; and said attachment being positioned over said rear of said passenger compartment, said elements protruding from said lower ends extending through said openings and being locked to said body located elements and establishing a releasable rigid connection between said band member and said body; and said attachment being further dimensioned, configured and adapted to impart a Targa-like, integral roll bar appearance to said vehicle.

15. A combination as in claim 14, wherein at least one of said pillar portions has an exterior side shaped with a hollow; and said combination further comprises a vehicle manufacturer's emblem mounted for display within said hollow.

16. A combination as in claim 14, wherein said pillar portions are upwardly and inwardly inclined toward said central bar portion; said upper ends are inwardly rounded to provide a smooth and continuous contour from said lower ends to said upper ends and to said central bar portion; said central bar portion has a generally uniform width; said pillar portions have widths which decrease from their lower to their upper ends; and said band member has front and rear edges which at the upper ends of said pillar portions are respectively located rearwardly of the same edges at the lower ends of said pillar portions.

17. A combination as in claim 16, wherein said vehicle has a front windshield and a header across the top of said windshield, and wherein said band member upper ends are generally positioned at the same elevation as said header.

18. A combination as in claim 17, wherein said band has an airfoil cross-sectional configuration is dimensioned, configured and adapted to reduce air flow turbulence behind said windshield in said passenger compartment.

* * * * *